United States Patent [19]
De Steese et al.

[11] 3,807,827
[45] Apr. 30, 1974

[54] MEANS AND METHOD OF PROCESSING RESERVOIRLESS THERMIONIC CONVERTERS

[75] Inventors: John G. De Steese, Kennewick; Robert E. Bowey, Richland, both of Wash.

[73] Assignee: McDonnell Douglas Corporation, Santa Monica, Calif.

[22] Filed: Nov. 15, 1971

[21] Appl. No.: 198,824

[52] U.S. Cl. .................. 316/20, 310/4 R, 316/30
[51] Int. Cl. .................................... H01j 9/38
[58] Field of Search .......... 310/4 R; 316/17, 18, 19, 316/27, 30, 20

[56] References Cited
UNITED STATES PATENTS

| | | | |
|---|---|---|---|
| 3,551,708 | 12/1970 | Hobson | 310/4 |
| 3,426,221 | 2/1969 | Harbaugh | 310/4 |
| 3,286,107 | 11/1966 | Fein et al. | 310/4 |
| 3,482,120 | 12/1969 | Wilson | 310/4 |

OTHER PUBLICATIONS

Harbaugh et al., "Development of a Reservoirless Thermionic Energy Converter," J. of Spacecraft and Rockets Vol. 3 No. 7, Jul. 1966 pp. 1,126–1,128.

Primary Examiner—Charles W. Lanham
Assistant Examiner—J. W. Davie
Attorney, Agent, or Firm—D. N. Jeu; Walter J. Jason; Donald L. Royer

[57] ABSTRACT

Low temperature radioisotopic thermionic converter having a construction wherein the converter adsorption area to vapor volume ratio is sufficiently high at the converter's operating pressure to achieve an area-dominated adsorption effect structure, is processed by first refluxing cesium at high collector temperature and high vapor pressure in the converter to purge remanent reactive impurities therein and then establishing the loci of converter maximum power versus cesium reservoir temperature for respectively different collector temperatures to allow adjustment of the converter at optimum cesium pressure and optimum collector temperature before sealing. Cesiation apparatus for batch-charging of a plurality of converters from a common cesium supply source includes a heated cesium reservoir container for enclosing the converters therein, and a collector heater, emitter and collector connection leads, and a means of sealing each converter at each converter position.

9 Claims, 11 Drawing Figures

MEANS AND METHOD OF PROCESSING RESERVOIRLESS THERMIONIC CONVERTERS

CROSS-REFERENCE TO RELATED APPLICATION

A radioisotopic thermionic energy converter including a quasi-vacuum condition therein and characterized by operating at low emitter current densities, low emitter and collector operating temperatures and in a nominally vacuum mode of operation with negligible ion neutralization of space charge and negligible plasma contributing electron scattering effects is shown, described and claimed in a copending patent application of Ned S. Rasor, John G. DeSteese and Kenneth A. Gasper, application Ser. No. 794,933 filed Jan. 29, 1969 for *radioisotopic Thermionic Converter* now abandoned.

BACKGROUND OF THE INVENTION

Our invention relates generally to radioisotopic thermionic converters and, more particularly, to a means and method of processing thermionic energy converters which do not utilize a specific reservoir for an additive such as cesium.

In conventional high temperature thermionic converters and in the previous low temperature thermionic converters as shown, described and claimed in the copending patent application of Ned S. Rasor, John G. DeSteese and Kenneth A. Gasper which is fully cross-referenced above, a cesium reservoir in liquid or compound form has been found necessary to maintain an adequate cesium pressure during converter lifetime. The inclusion of a liquid reservoir complicates the system integration of a thermionic converter because performance is controlled by an optimization involving three variables; emitter temperature ($T_e$), collector temperature ($T_c$) and reservoir temperature ($T_r$). With a cesium compound reservoir (for example, a cesium-graphite compound), the reservoir can be located to operate at collector temperature and, therefore, reduce the performance optimization to an interaction of two variables. Converter performance is, however, influenced strongly by the quality of the compound which, with current technology, may be evaluated only after a converter is sealed.

A reservoirless thermionic converter which operates with cesium only in the vapor state is disclosed in the article entitled "Development of a Reservoirless Thermionic Energy Converter" by W. E. Harbaugh, F. G. Block and A. Basiulis published in the Journal of Spacecraft and Rockets, Volume 3, No. 7, July 1966. The converter is described as processed on an ultrahigh-vacuum system which incorporated a cesium distillation apparatus to reduce residual background gases to a minimum. At the end of processing, the temperature of a liquid supply reservoir was optimized for maximum converter power output. The converter envelope was maintained at a temperature higher than that of the liquid reservoir and a hot pinch-off was made to sever the reservoir from the converter. Such reservoirless converter was then ready for (test) use. It was noted, however, that maintaining proper cesium pressure for long periods of operation of the reservoirless converter is a difficult problem because cesium is extremely active, and any loss of it causes a reduction in pressure and converter power output. The conclusion was that reservoirless converter operation is feasible but further effort is required to determine the extent of cesium loss mechanism in more detail and to provide corrective measures which can be included in reservoirless converter designs.

SUMMARY OF THE INVENTION

Briefly, and in general terms, our invention is preferably accomplished by providing a thermionic converter having a construction wherein emitter and collector surfaces are such that the available adsorption area to vapor volume ratio is more than adequate to achieve an electrode surface adsorption-dominated cesium system at the converter's normal operating pressure, and reaction of remanent impurities in the converter is forced to a conclusion by refluxing cesium at relatively high collector temperature and pressure in the converter before sealing. At the end of this purging process, the temperatures of the cesium supply source and converter collector are adjusted to create optimum or desired operation conditions in the converter. Complete performance characteristics and defective converters can thus be verified and observed before seal-off.

Converters processed according to this method contain sufficient cesium adsorbed on the emitter and collector surfaces to provide the required operating vapor pressure. The cesium charging method permits converter performance control and tuning by adjustment of cesium vapor pressure before seal-off, and impurity reactions with cesium are eliminated before the converter is sealed. The removal of impurity effects under conditions more stringent than normal operation insures a negligible loss of cesium during the subsequent converter lifetime. Further, an approximately exponential decrease in cesium loss rate resulting from any remaining impurity reactions can be obtained with the low temperature converters which inherently operate at lower temperatures than the conventional high temperature converters.

An application of the cesium charging method includes batch-charging of a plurality of converters from a common cesium supply source in apparatus easily adapted to automatic (including computer) control techniques. In such cesiation apparatus, a plurality of thermionic converters is contained in a heated cesium reservoir container or vessel, and a collector heater, emitter and collector connection leads, and a means (for example, an electron-beam filament) of sealing each converter are provided at each converter position. The converters are processed as described above, and any defective converter is identified before seal-off and salvaged after cesium has been pumped out of the reservoir container.

BRIEF DESCRIPTION OF THE DRAWINGS

Our invention will be more fully understood, and other features and advantages thereof will become apparent, from the following description of exemplary means and method of accomplishing the invention. The description is to be taken in conjunction with the accompanying drawings, in which.

DESCRIPTION OF THE PRESENT MEANS AND METHOD

In the following description of exemplary means and method of accomplishing our invention, some specific values and types of components are disclosed. It is to be understood, of course, that such values and types of components are given as examples only and are not intended to limit the scope of this invention in any manner.

Figure 1:
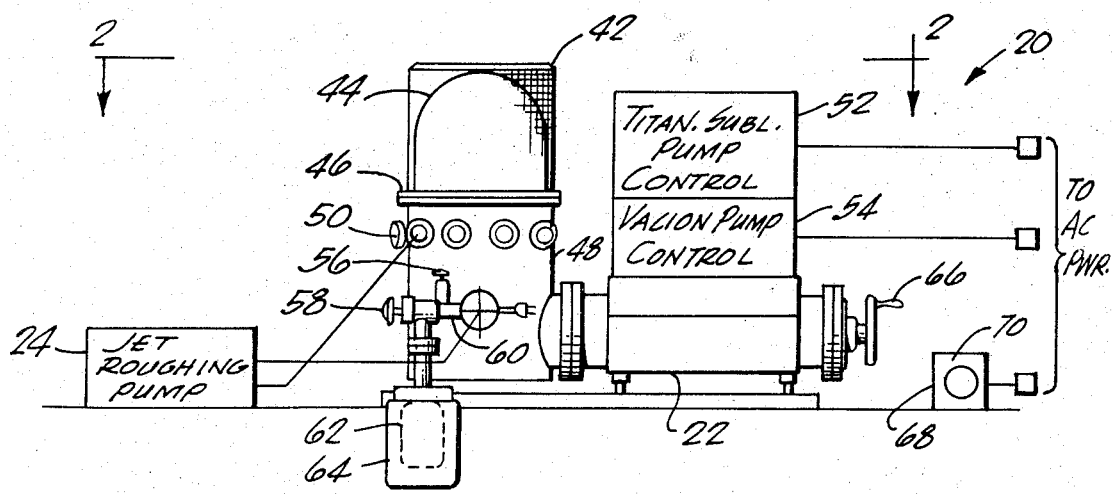
FIG. 1 is a front elevational view of a system for processing reservoirless thermionic energy converters in accordance with our invention.

FIG. 1 is a front elevational view of a system 20 for processing reservoirless radioisotopic thermionic converters in accordance with our invention. The system 20 is essentially composed of conventional and commercially available components. The system 20 generally depicts the overall configuration and assembly of the various components involved in practicing this invention. Thus, a broad description of the system 20 is believed to be adequate and a detailed description thereof need not be given.

Figure 2:
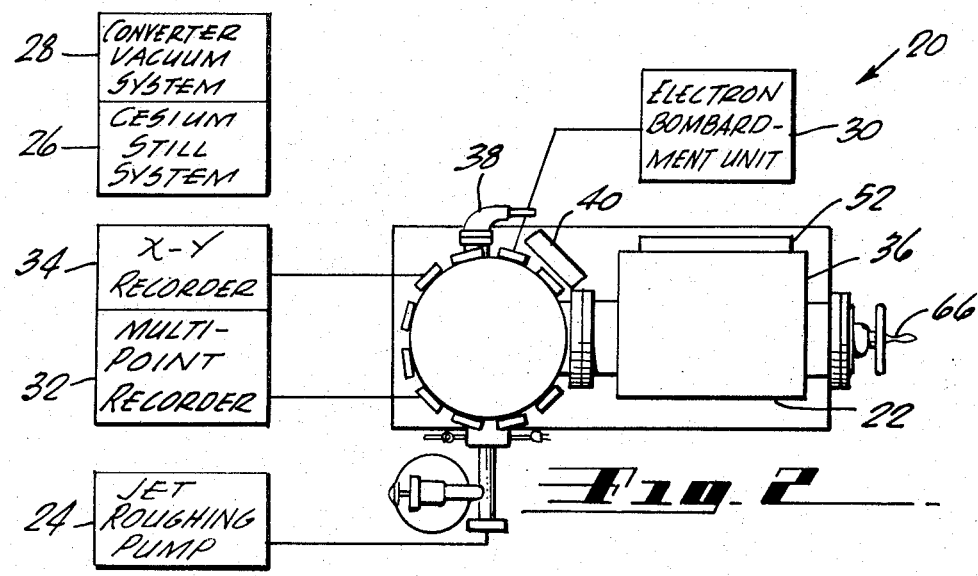
FIG. 2 is a top plan view of the system as taken along the line 2—2 indicated in FIG. 1.

FIG. 2 is a top plan view of the system 20 as taken along the line 2—2 indicated in FIG. 1. As illustrated in FIGS. 1 and 2 in partially diagrammatic form, the system 20 basically includes a chamber vacuum system 22 and its jet roughing pump 24, cesium still system 26, converter vacuum system 28, electron bombardment unit 30, multipoint recorder 32 for recording various thermocouple-sensed temperatures, and $x$—$y$ plotter 34 for plotting converter voltages and currents. The vacuum system 22 can be, for example, a Varian Associates Model VI-932-0028 Vacuum System. The electron bombardment unit 30 can be a Thermo Electron Model EB-105R Electron Bombardment Unit, and the multipoint recorder 32 can be a 24-point Honeywell Electronik 26 Multipoint Recorder. The $x$—$y$ plotter 34 is, for example, a Mosley 7000 Series X–Y Plotter.

Significant components of interest shown in the chamber vacuum system 22 include vacion (vacuum ion) pump 36, titanium sublimation pump cartridge 38, cooling fan 40, bell jar guard 42, pyrex bell jar 44, viton (elastomer type) seal 46, stainless steel base chamber 48 with access ports 50, titanium sublimation pump control unit 52, vacion pump control unit 54, air inlet valve (and thermocouple gauge) 56, viton-sealed roughing pump valve 58, stainless steel manifold 60, vacsorb (vacuum sorption) pump 62, liquid nitrogen container 64, isolation valve 66 for the vacion pump, and thermocouple gauge control unit 68 with meter 70 for the thermocouple gauge. The converter vacuum system 28 similarly includes, in essence, a vacsorb pump, vacion-titanium sublimation combination pump and their control units (all commercially available components and not shown). The vacuum systems 22 and 28 are well known to those skilled in the art and merely produce suitable vacuum conditions, and only a general concept of their construction is required.

Figure 3:
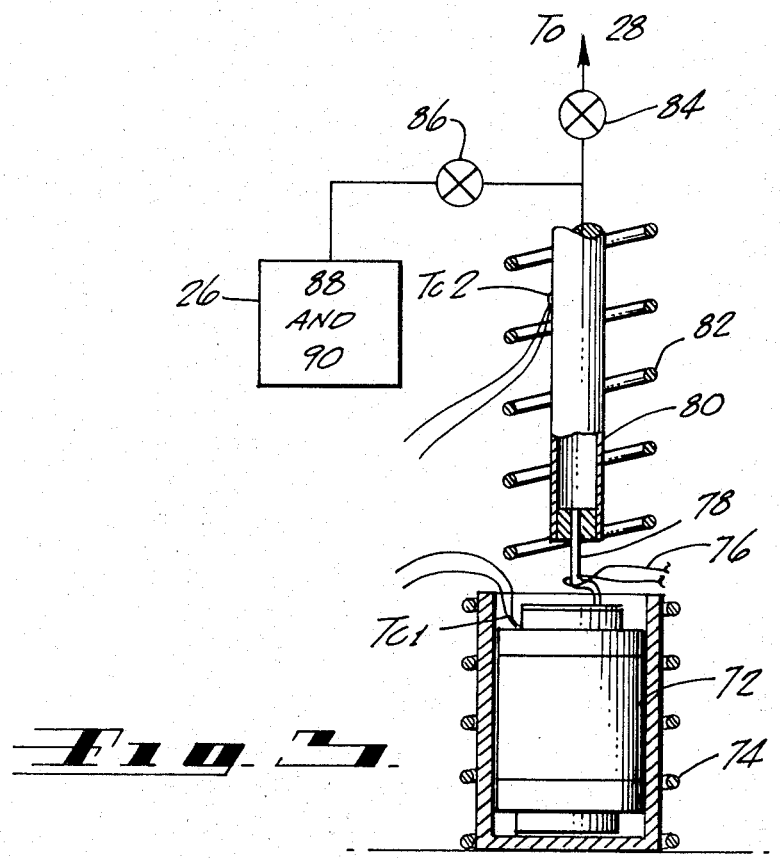
FIG. 3 is a front elevational view, shown partly in section and partly in diagrammatic form, of the main elements of the system which are involved in processing a radioisotopic thermionic converter.

FIG. 3 is a front elevational view, shown partly in section and partly in diagrammatic form, of the main elements of the system 20 which are involved in the processing of a radioisotopic thermionic converter 72. The portion shown in structural form can be normally located during processing in the vacuum environment under the bell jar 44 (FIG. 1). A collector heater 74 is provided for the converter 72 and electron beam filament 76 is provided about a (nickel) transfer or filler tube 78 of the converter. The filler tube 78 is suitably connected to (kovar) tubing 80 which is also provided with a heater 82. The tubing 80 is suitably connected by valve 84 to the vacsorb pump and combination pump of the converter vacuum system 28. Collector thermocouple TC1 and tubing thermocouple TC2 are illustrative of the thermocouples provided throughout the system 20.

The tubing 80 is also connected by another valve 86 to a cesium reservoir 88 having a heater 90 (shown together as a single block). The reservoir 88 can be part of the conventional cesium still system 26. In a simplified system, the reservoir branch can be omitted and a cesium ampoule is mounted within the tubing 80. After outgassing, the valve 84 is closed and suitable means is operated to open the ampoule. The closed tubing 80 then becomes the cesium reservoir and heater 82 can be used to vary such reservoir temperature which is suitably adjusted during processing. The heater 82 is also representative of the heaters provided to maintain the tubing from the cesium still reservoir 88 to the converter 72 normally at a temperature higher than that of the converter. This prevents any condensation of the cesium outside of the converter 72 during processing.

Figure 4:
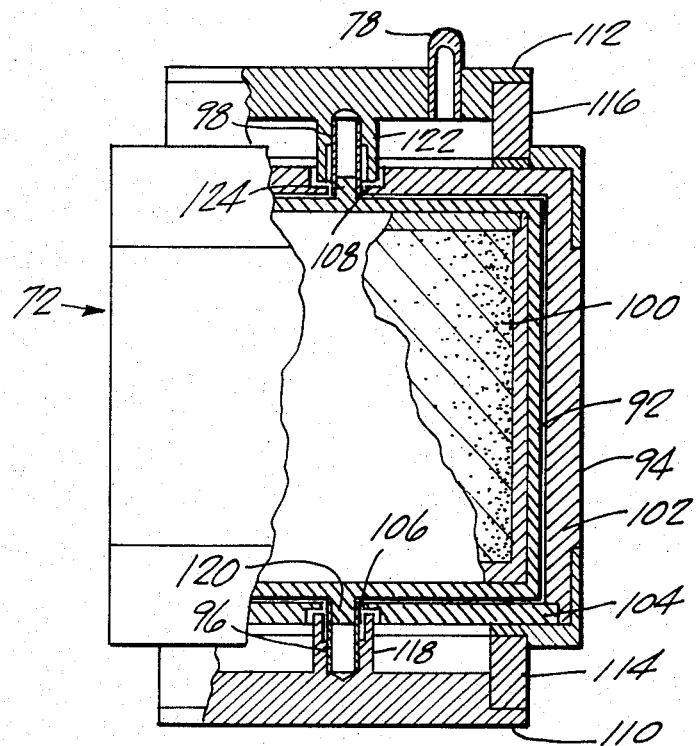
FIG. 4 is an elevational view of the radioisotopic thermionic converter shown partially broken away and partially in section to illustrate its construction.

FIG. 4 is an elevational view of the radioisotopic thermionic converter 72 (FIG. 3) shown partially broken away and partially in section to illustrate its construction. This converter 72 is generally similar to the Radioisotopic Thermionic Converter of Ned S. Rasor, John G. DeSteese and Keeneth A. Gasper shown, described and claimed in the copending patent application which is fully cross-referenced above. The converter 72 essentially differs from the converter shown in FIGS. 14A and 14B of the cross-referenced application in that it does not include an integral cesium reservoir.

The converter 72 generally includes an emitter capsule 92 axially supported in and spaced from a collector housing 94 by normally lower and upper thin-walled tubes 96 and 98. A right circular cylindrical radioisotope fuel pellet 100 is suitably encapsulated by the capsule 92. The collector housing 94 includes a body cylinder 102 and a lower disc 104 welded to the open lower end thereof to close the same except for lower and upper central openings 106 and 108. Lower and upper cap discs 110 and 112 are attached to the housing 94 by respective insulator rings 114 and 116. The lower tube 97 is press-fitted at one end into a collar 118 of the cap disc 110 and onto a stem 120 of the capsule 92 at the other end. Similarly, the upper tube 98 engages a collar 122 of the cap disc 112 and a stem 124 of the capsule 92. The emitter capsule 92 is thus axially supported by the tubes 96 and 98. Filler tube 78 (shown closed after electron bombardment) can communicate with the interelectrode space between the substantially full $4\pi$ external capsule emitter surface and internal housing collector surface.

Figure 5:
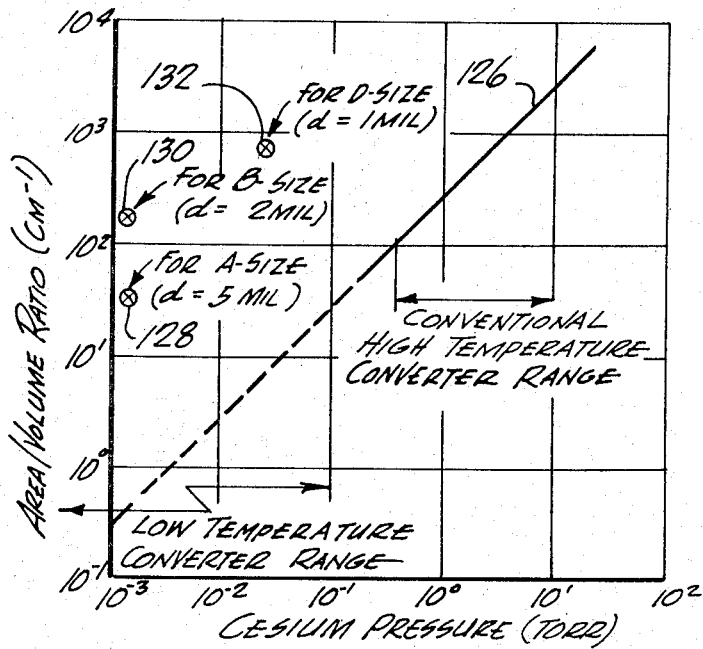
FIG. 5 is a graph showing an extrapolated curve of the relationship between minimum area to volume ratio versus cesium pressure for area-demoinated adsorption effect structures.

FIG. 5 is a graph showing a curve 126 of the relationship between minimum area to volume ratio versus cesium pressure for area-dominated adsorption effect structures. This graph is patterned after a similar one from the article entitled "The Development of a High-Temperature Reservoir for Automatic Control of Cesium Pressure" by W. E. Harbaugh and A. Basiulis published in the Proceedings of Thermionic Conversion Specialist Conference, Houstin, Texas, November 1966. The curve 126 has been extrapolated into the low temperature converter range of the nominally vacuum mode operation converter 72 as indicated by the broken line portion of the curve. The range indicated can be from $10^{-1}$ to $10^{-6}$ torr, approximately. Plots 128, 130 and 132 of the area to volume ratios of the converter 72 for three different sizes thereof (with interelectrode spacing $d$) at their respective operating pressures are also indicated in the graph. The adsorption area to vapor volume ratio values are indicated by the logarithmic scale along the ordinate axis.

From these plots, it can be seen that all three of the differently sized converters 72 have structures which are well above the minimum area to volume ratio, at their respective operating pressures, for achieving an electrode surface adsorption-dominated cesium system. Since a cesium reservoir of any kind is provided only to supply cesium which is lost through reaction with impurities trapped in the converter 72, if these impurities can be eliminated and providing adequate surface area were available, operation of the converter could be achieved by sealing just sufficient cesium into the device to satisfy the electrode adsorption characteristics at converter operating temperatures. Thus, processing of the converter 72 includes a cesium charging method which eliminates reactive impurities and then an optimization procedure before sealing to provide an adsorption mode (reservoirless) converter with an increased and long lifetime, and significantly improved characteristics and performance.

Processing of the thermionic converter 72 is commenced with proper installation of all necessary components and check-out of all instrumentation, electrical and mechanical connections, and the like in the system 20 shown in FIGS. 1, 2 and 3. At least one converter 72 is mounted on the platform under the bell jar 44 and sealed with filler tube 78 connected to tubing 80 which is suitably passed through an access port 50. The bell jar system is conventionally pumped down by the chamber vacuum system 22 (first phase by the jet roughing pump 24) to approximately $10^{-7}$ torr. The tubing from the reservoir 88 to the converter 72 is heated gradually by heaters such as the heater 82 to 275° to 300° C, and the converter is similarly heated by the collector heater 74 to 650° C. At the same time, the reservoir 88 is also being gradually heated to approximately 300° C, for example. With the valve 84 opened and the valve 86 closed, the converter 72 is outgassed and pumped down by the converter vacuum system 28 until a pressure of $1 \times 10^{-8}$ torr is attained. The filler tube 78 is outgassed by heating with the electron beam filament 76 until the tube reaches a bright red heat for five minutes, for example.

With a converter vacuum system pressure of $1 \times 10^{-8}$ torr, the valve 84 is first tightly closed before the valve 86 is opened to connect the converter 72 to the reservoir 88. The reservoir 88 is heated to a temperature which provides a pressure higher than the normal operating pressure of the converter 72. Initial processing of the converter 72 maintained collector (and of course, emitter) and reservoir temperatures above those for normal operating conditions with the connecting tubing temperature above the reservoir temperature but below collector temperature. With an A-size converter 72, for example, initial processing lasted 16 hours with collector temperature at about 925° K, tubing temperature from 650° to 675° K and reservoir temperature at approximately 646° K providing a cresium vapor pressure of 10 torrs. The high converter temperature causes a refluxing action wherein the high pressure cesium vapor from the reservoir flows through the heated connecting tubing and is flashed back when it reaches the hot converter. Thus, cesium vapor a few order of magnitude in excess of normal operating pressure is refluxed in the converter 72 to "burn-out" remanent reactive impurities.

This initial processing of the converter 72 as found from experience should be in excess of 10 hours and under 100 hours according to the construction of the converter involved. The lower limit or adequacy of processing can be checked by subsequent testing but the upper limit is normally governed by the permissible damage to the converter structure. For example, damage to the capsule 92 occurred in a similar converter 72 when refluxing was tried for 40 hours. Various factors which are not readily defined affect the minimum processing time required and such time can only be obtained by experience. Details of construction affecting cesium accessibility of surfaces involved generally increase the minimum time proportionately with difficulty of accessibility. The higher the area to volume ratio, the less appears to be the required minimum time. Different sizes of a paraticular construction basically do not affect the minimum time significantly since the cesium acts uniformly on similar constructions. For the exemplary converter 72 construction, the minimum time is about 10 or 12 hours for different sizes thereof, for example.

The collector temperature of 925° K corresponded approximately to about 200° K above optimum operating temperature for the A-size converter 72. The collector temperature is preferably set to about 200° K above optimum for refluxing and should be at least about 100° K higher than normal operating temperature to cause saturation and rapid reaction of the impurities and cesium. This, of course, should be accompanied by cesium pressure of at least 1 or 2 orders in excess of normal operating pressure. In the A-size converter 72 example given previously above, its normal operating pressure is about $10^{-2}$ torr so that 10 torrs is 3 orders above normal.

Optimum and normal operating temperatures and pressures are usually known fairly closely from experience and such values can be easily verified as being within their very broad required limits during the optimization procedure. If necessary, due to unusual error, the purging process can be repeated with readjusted collector and reservoir temperatures. It should be noted that the preferred optimum operating conditions provide maximum converter output voltage, for example, or other condition that may be desired or required. In any event, the normal operatinf conditions are only slightly different in value from the optimum ones.

Figure 6:
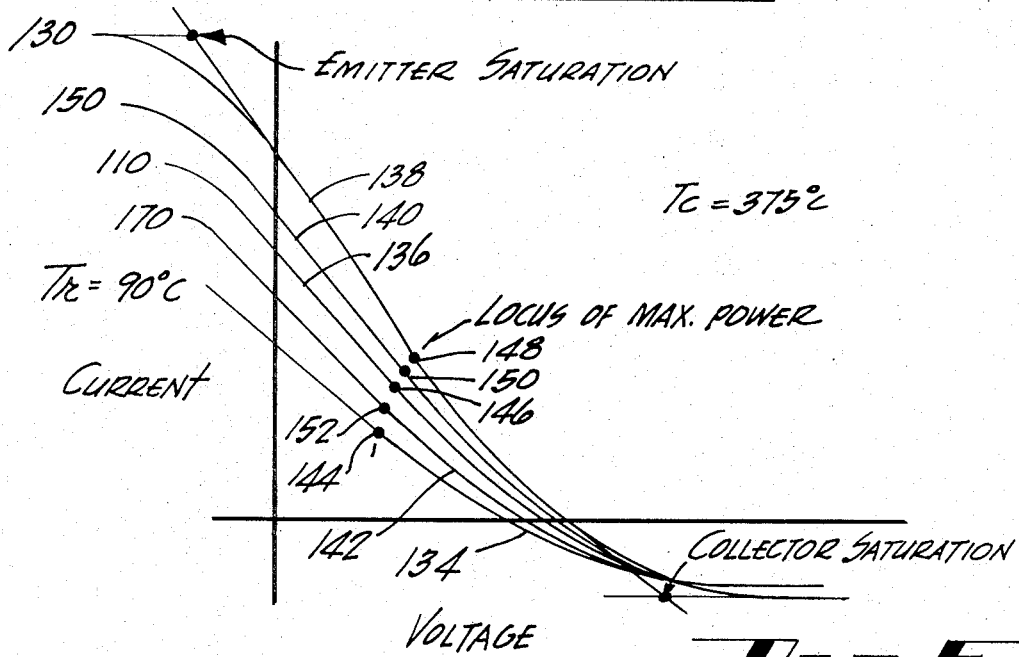
FIG. 6 is a graph showing current versus voltage curves of a converter for respectively different cesium reservoir temperatures while holding the converter collector at a constant temperature.

FIG. 6 is a graph showing current versus voltage curves 134, 136, 138, 140 and 142 which illustrate the first part of an optimization procedure that is performed on the converter 72 following initial processing. The collector temperature is reduced to about 375° C (648° K), for example, and held constant while the temperature of the cesium reservoir 88 is varied from about 90° to 170° C in steps of 20° C. At each step, a current versus voltage curve is taken on the x–y plotter 34 (FIG. 2). The curve 134 is for a cesium reservoir temperature of 90° C, curve 136 for 110° C, curve 138 for 130° C, curve 140 for 150° C and curve 142 for 170° C. The maximum power point for each curve is plotted at coordinates of one-half short circuit current and one-half open circuit voltage. Thus, maximum power points 144, 146, 148, 150 and 152 establish a locus of maximum power. It can be seen that the greatest maximum power point 148 occurs in curve 138 which is with a cesium reservoir temperature of 130° C, for example.

Figure 7:
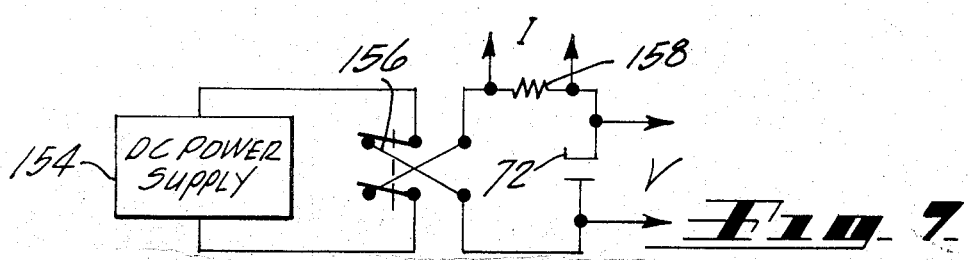
FIG. 7 is a circuit diagram showing the application of a variable output voltage power supply to a converter for obtaining current and voltage signals used in plotting a curve therefrom.

FIG. 7 is a circuit diagram showing the application of a variable output voltage from a direct current power supply 154 to the diode converter 72. The output of the power supply 154 is applied to the converter 72 through a reversing switch 156. A small sensing resistor 158 for current measurement is connected in series with the converter 72. The signals across the resistor 158 and converter 72 are, of course, provided to the x–y plotter 34. Before taking a curve, the maximum power point is approximately determined first and the converter must sit at near maximum power point load for at least 5 minutes. The power quadrant curve portion between the x-y axes is preferably taken first before the emitter and collector saturation curve portions are taken. The power supply 154 can be a Rowan Controller Company Model M20-4 DC Variable Power Supply and the resistor 158 can have a resistance of 0.1 ohm, for example. The collector is set to a temperature 25° C higher in steps and similar sets of curves and maximum power points are obtained for collector temperatures of 400°, 425°, 450° and 475° C, for example.

Figure 8:
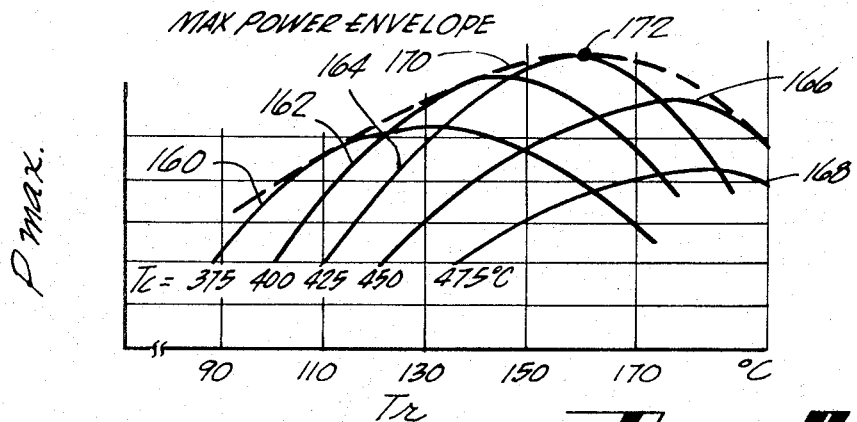
FIG. 8 is a graph showing curves of maximum converter power versus cesium reservoir temperature for respectively different constant collector temperatures to establish a maximum power envelope.

FIG. 8 is a graph showing curves 160, 162, 164, 166 and 168 of maximum converter power versus cesium reservoir temperature for respectively different constant collector temperatures. The curve 160 represents the locus of maximum power of the set of curves shown in FIG. 6 for a constant collector temperature of 375° C. A broken line curve 170 can be drawn as indicated to provide a maximum power envelope having a peak point 172 which is at optimum collector and reservoir temperatures. The collector temperature and cesium reservoir temperature are preferably set at these optimum values, and 2 to 4 hours are allowed prior to electron bombardment seal-off of the filler tube 78 if the power output level is acceptable. Power is then applied to the electron beam filament 76 until the filler tube 78 melts and a ball is formed on the remaining stem about one-eighth inch from the converter top.

Figure 9:
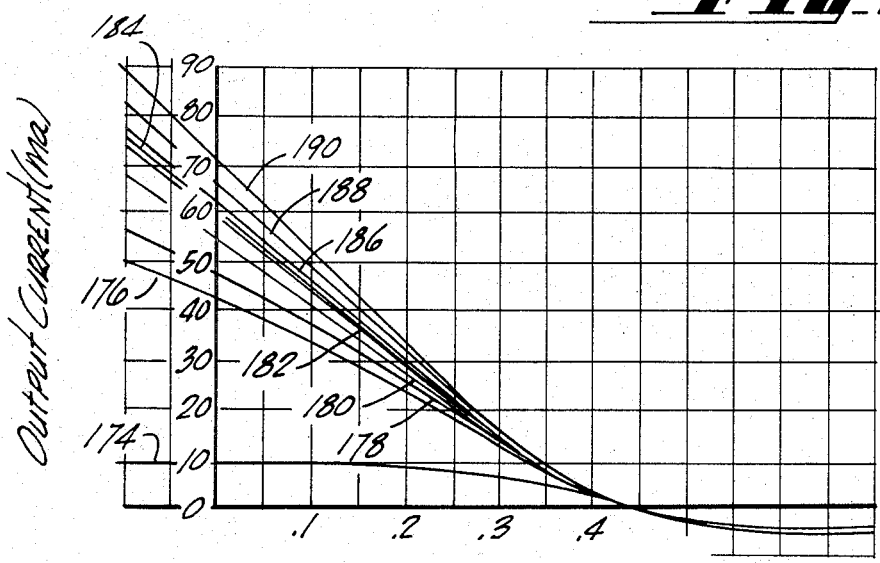
FIG. 9 is a graph showing curves of output current versus output voltage of a processed converter for respectively different converter filler stem temperatures to establish the effectiveness of its processing.

FIG. 9 is a graph showing curves of output current versus output voltage of a processed converter 72 for respectively different filler stem temperatures to establish the effectiveness of its processing. The converter 72 had a thermal inventory of approximately 3 watts and a collector temperature of 618° K. A variable temperature sink (not shown) was clamped to the stem tip of the closed filler tube 78 and the curves 174, 176, 178, 180, 182, 184 and 186 were obtained for respective stem temperatures of 303°, 340°, 356°, 360°, 363°, 368°, 371° and 377° K. Since adsorbed cesium could be frozen out of a converter with stem temperatures below 380° K, these curves illustrate the results of such temperatures. The curves 188 and 190 are the boundary curves for stem temperatures varying from 380° to 650° K. It can be seen that stem temperature variations between approximately 380° to 650° K produced no significant effect on the output of the processed converter 72. Thus, it is evident that the converter 72 was functioning properly in the surface adsorption mode. The converter 72 has operated in a continuing lifetest approaching 20,000 hours and has shown no measurable degradation in electrode work functions giving evidence to any significant loss of cesium. The test is not yet terminated and the degradation in power output is only that due to normal radioisotope decay.

Figure 10:
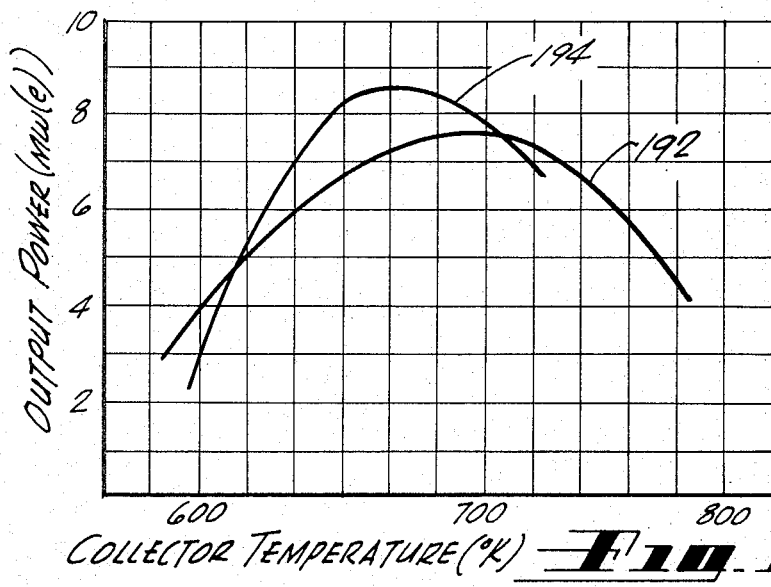
FIG. 10 is a graph showing comparative curves of output power versus collector temperature for a processed reservoirless converter and one with a cesium-graphite compound reservoir.

FIG. 10 is a graph showing comparative curves 192 and 194 of output power versus collector temperature for the processed reservoirless converter 72 and one with a cesium-graphite compound reservoir. The power curve 192 is the output for the converter 72 which has the promethia-fueled thermal inventory of 3.1 watts. The power curve 194 is the output for a converter having a higher promethia-fueled thermal inventory of 3.8 watts. The power curve 192 shows a single function dependence of converter output on collector temperature, and is generally broader than those using a cesium-graphite reservoir as exhibited typically by the power curve 194. The broader power curve of the processed converter 72 would make its decay characteristic less severe than that of other converters and can extend the lifetime and the range of application for radioisotope-fueled devices.

Figure 11:
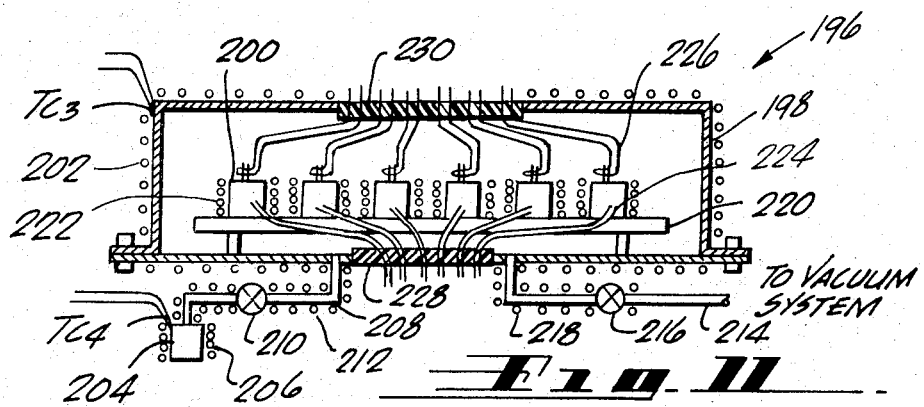
FIG. 11 is a simplified elevational view, sectionally shown, of cesiation apparatus for processing a batch of reservoirless thermionic converters.

FIG. 11 is a simplified elevational view, sectionally shown, of means for processing a batch of reservoirless thermionic converters. The cesiation apparatus 196 includes a cesium reservoir vessel or container 198 for containing a plurality of converters 200, container heater 202, cesium supply source 204, source heater 206, source tubing 208 with a bakable source control valve 210 and heater 212, and vacuum tubing 214 with a bakable vacuum control valve 216 and heater 218. The converters 200 are suitably mounted on a platform 220 in the container 198. A collector heater 222, collector temperature thermocouple and emitter and collector electrode connection leads 224, and an electron-beam filament 226 for sealing the filler tube of each converter are provided at each converter position. The thermocouple and electrode connection leads 224 are passed through a suitable leadthrough structure 228 and the filaments 226 are also passed through a similar lead-through structure 230. A reservoir container thermocouple TC3 is mounted on the container 198 preferably at its coolest spot and a supply source thermocouple TC4 is suitably mounted to the source 204.

The converters 200 are processed in a manner similar to that described above with respect to the converter 72. Generally, after installation of the converters 200 in the container 198 which is suitably sealed, the converters and container, and tubings 208 and 214 can be gradually heated. The source valve 210 is kept closed and the vacuum value 216 opened to pump down the container 198 and the converters 200 to a pressure of, for example, $1 \times 10^{-8}$ torr. The cesium source 204 is also gradually heated to a temperature above that of the container 198. The vacuum valve 216 is then closed before the source valve 210 is opened to admit heated cesium through heated tubing 208 into the container 198 and the converters 200. The source valve 210 is then closed and source heater 206 turned off.

The collectors of the converters 200 and the reservoir container 198 are maintained at temperatures well above those for normal converter operating conditions for initial processing wherein refluxing between reservoir and converters take place for a predetermined period. After initial processing and optimum collector temperature and optimum cesium reservoir temperature (pressure) are determined from the optimization procedure described previously for the converter 72, these temperatures can be set by the collector heaters 222 and container heater 202. The collector and reservoir temperatures can, of course, be set to produce performance conformity among members of the batch. This may require that some of the converters 72 be set at normal operating conditions which are slightly off-optimum for them.

If their power output levels are acceptable, the converters 200 are then sealed by the electron-beam filaments 226. Any defective converter 200 would be identified before seal-off and subsequently salvaged. After sealing of all of the satisfactory converters 200, the source valve 210 is opened so that cesium from the container 198 will be condensed and collected in the cooler source 204. It is apparent that the apparatus 196 and the method of processing the converters 200 would be readily susceptible to automatic control with a resulting reduction in manufacturing costs and improvement of product quality.

It is noted that the container heater 202 is designed to heat the container 198 completely and thoroughly. The container 198 also preferably includes a lower section and a separable upper section wherein the platform 220, source tubing 208 and vacuum tubing 214 are attached to the lower section. The leadthrough structure 230 in the upper section of container 198 mounts the filaments 226 such that they can be easily positioned about their corresponding converter filler tubes. Of course, the apparatus 196 can be readily modified so that different sizes and configurations of converters could be accommodated and processed in the container 198.

It is, therefore, to be understood that while exemplary means and method of our invention have been described above and shown in the accompanying drawings, the particular means and method described are merely illustrative of, and not restrictive on, the broad invention and that various changes in design, structure and arrangement may be made in the invention without departing from the spirit and scope of the appended claims.

We claim:

1. A method of processing a reservoirless thermionic converter including a collector and an emitter with an additive provided from a reservoir, which comprises the steps of:

producing a relatively high vacuum of at least the order of $10^{-7}$ torr in said converter;

heating said collector and said emitter to predetermined high temperatures of at least about 100°K higher than their normal operating temperatures, and heating said reservoir to a predetermined high temperature to provide an additive pressure during refluxing of at least about one order in excess of normal operating pressure of said converter;

refluxing said additive between said reservoir and said converter for a minimum predetermined period of at least about 10 hours whereby reaction of remanent impurities is forced to a conclusion in said converter;

determining optimum temperatures of said collector and said reservoir for optimum maximum power output of said converter;

setting said collector and said reservoir to predetermined temperatures established relative to said optimum temperatures; and sealing said converter.

2. The invention as defined in claim 1 wherein said collector and said reservoir are set at optimum temperatures and said converter is sealed at such settings.

3. A method of processing a reservoirless thermionic converter including a collector and an emitter with a cesium additive provided from a reservoir, which comprises the steps of:

producing a relatively high vacuum in said converter;

heating said collector and said emitter to predetermined high temperatures of at least approximately 100°K higher than their normal operating temperatures, and heating said reservoir to a predetermined high temperature to provide an additive pressure during refluxing of at least one order in excess of normal operating pressure of said converter;

refluxing said additive between said reservoir and said converter for at least a minimum predetermined period whereby reaction of remanent impurities is forced to a conclusion in said converter;

determining optimum temperatures of said collector and said reservoir for optimum maximum power output of said converter;

setting said collector and said reservoir to predetermined temperatures established relative to said optimum temperatures; and sealing said converter.

4. The invention as defined in claim 1 wherein optimum temperatures of said collector and said reservoir are determined by plotting curves of said converter current versus voltage for different reservoir temperatures at a constant collector temperature to obtain a locus of maximum power points on said current versus voltage curves, repeating said aforementioned plotting for different constant collector temperatures to obtain additional loci of maximum power points, plotting curves of maximum power versus reservoir temperature, and plotting a maximum power envelope from said latter curves to obtain an envelope peak corresponding to said optimum maximum power output of said converter whereby said optimum temperatures of said collector and said reservoir can be established from said envelope peak.

5. The invention as defined in claim 1 further comprising the step of testing said sealed converter to determine the sufficiency of said minimum period for forcing reaction of said remanent impurities to a conclusion whereby adequacy of said minimum period for different sizes of converters of generally similar construction can be verified.

6. The invention as defined in claim 3 wherein optimum temperatures of said collector and said reservoir are determined by plotting curves of said converter current versus voltage for different reservoir temperatures at a constant collector temperature to obtain a locus of maximum power points on said current versus voltage curves, repeating said aforementioned plotting for different constant collector temperatures to obtain additional loci of maximum power points, plotting curves of maximum power versus reservoir temperature, and plotting a maximum power envelope from said latter curves to obtain an envelope peak corresponding to said optimum maximum power output of said converter whereby said optimum temperatures of said collector and said reservoir can be established from said envelope peak.

7. The invention as defined in claim 6 further comprising the step of testing said sealed converter to determine the sufficiency of said minimum period for forcing reaction of said remanent impurities to a conclusion whereby adequacy of said minimum period for different sizes of converters of generally similar construction can be verified.

8. In a means for processing a batch of reservoirless thermionic converters, cesiation apparatus comprising:

a container for containing and sealing a plurality of said converters therein, each of said converters including a collector, emitter, and filler tube;

a collector heater, collector temperature sensor, filler tube sealing means, and collector, emitter and sensor connection leads provided for each of said converters in said container;

a container heater for completely and thoroughly heating said container;

a container temperature sensor;

cesium source means communicating with said container to supply cesium thereto;

source valve means for controlling communication between said source means and said container;

a source heater;

a source temperature sensor;

vacuum means communicating with said container to produce a vacuum therein; and vacuum valve means for controlling communication between said vacuum means and said container, and wherein said container includes a lower section and a separable upper section, and a platform attached to said lower section for mounting said converters thereon, said source means and said vacuum means communicating with said container through said lower section.

9. The invention as defined in claim 8 wherein each of said filler tube sealing means includes an electron-beam filament positionable about its corresponding filler tube, and said upper section includes a filament lead-through structure located above said converters whereby said filaments can be positioned readily about their respective converter filler tubes.

* * * * *